(12) United States Patent
Ranjan et al.

(10) Patent No.: US 11,911,724 B2
(45) Date of Patent: Feb. 27, 2024

(54) ENHANCED REFRIGERATION PURGE SYSTEM

(71) Applicant: Carrier Corporation, Palm Beach Gardens, FL (US)

(72) Inventors: Rajiv Ranjan, South Windsor, CT (US); Yinshan Feng, Manchester, CT (US); Parmesh Verma, South Windsor, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 178 days.

(21) Appl. No.: 15/734,842

(22) PCT Filed: Dec. 3, 2019

(86) PCT No.: PCT/US2019/064174
§ 371 (c)(1),
(2) Date: Dec. 3, 2020

(87) PCT Pub. No.: WO2020/117762
PCT Pub. Date: Jun. 11, 2020

(65) Prior Publication Data
US 2021/0229024 A1    Jul. 29, 2021

Related U.S. Application Data

(60) Provisional application No. 62/774,701, filed on Dec. 3, 2018.

(51) Int. Cl.
*B01D 53/02* (2006.01)
*F25B 49/02* (2006.01)
(Continued)

(52) U.S. Cl.
CPC .............. *B01D 53/02* (2013.01); *F25B 49/02* (2013.01); *B01D 53/228* (2013.01); *B01D 2253/204* (2013.01); *F25B 43/043* (2013.01)

(58) Field of Classification Search
CPC ................. B01D 53/02; B01D 53/228; B01D 2253/204; F25B 49/02; F25B 43/043
See application file for complete search history.

(56) References Cited

U.S. PATENT DOCUMENTS

| | | | |
|---|---|---|---|
| 2,044,166 | A | 6/1936 | Hayden |
| 4,304,102 | A | 12/1981 | Gray |

(Continued)

FOREIGN PATENT DOCUMENTS

| | | | |
|---|---|---|---|
| CN | 1791774 | A | 6/2006 |
| CN | 101254918 | A | 9/2008 |

(Continued)

OTHER PUBLICATIONS

International Search Report of the International Searching Authority; International Application No. PCT/US2019/063502; International Filing Date: Nov. 27, 2019; dated Mar. 30, 2020; 8 pages.

(Continued)

*Primary Examiner* — Henry T Crenshaw
(74) *Attorney, Agent, or Firm* — CANTOR COLBURN LLP

(57) ABSTRACT

A heat pump includes a vapor compression system and a cooling unit thermally coupled to the vapor compression system. A purge system is arranged in fluid communication with the vapor compression system. The purge system includes at least one separator operable to separate contaminants from a refrigerant purge gas provided to the purge system from the vapor compression system.

16 Claims, 3 Drawing Sheets

(51) Int. Cl.
*B01D 53/22* (2006.01)
*F25B 43/04* (2006.01)

(56) References Cited

U.S. PATENT DOCUMENTS

| | | | |
|---|---|---|---|
| 4,316,364 A | 2/1982 | Spauschus | |
| 4,417,451 A | 11/1983 | Spauschus | |
| 4,842,621 A | 6/1989 | Robbims et al. | |
| 4,906,256 A | 3/1990 | Baker et al. | |
| 4,984,431 A | 1/1991 | Mount et al. | |
| 5,032,148 A | 7/1991 | Baker et al. | |
| 5,044,166 A * | 9/1991 | Wijmans | B01D 53/22 62/85 |
| 5,059,374 A | 10/1991 | Krueger et al. | |
| 5,062,273 A * | 11/1991 | Lee | B01D 53/229 62/85 |
| 5,071,451 A | 12/1991 | Wijmans | |
| 5,089,033 A | 2/1992 | Wijmans | |
| 5,156,657 A | 10/1992 | Jain et al. | |
| 5,355,685 A | 10/1994 | Stie et al. | |
| 5,429,662 A | 7/1995 | Fillet | |
| 5,517,825 A * | 5/1996 | Manz | F25B 43/043 62/85 |
| 5,598,714 A | 2/1997 | Strout et al. | |
| 5,611,841 A | 3/1997 | Baker et al. | |
| 5,636,526 A | 6/1997 | Plzak et al. | |
| 5,718,119 A | 2/1998 | Wakita et al. | |
| 5,806,322 A | 9/1998 | Cakmakei et al. | |
| 5,842,349 A | 12/1998 | Wakita et al. | |
| 5,858,065 A | 1/1999 | Li et al. | |
| 5,901,780 A * | 5/1999 | Zeigler | F25B 17/083 62/480 |
| 6,128,916 A | 10/2000 | Callahan et al. | |
| 6,134,899 A | 10/2000 | Brown et al. | |
| 6,224,763 B1 | 5/2001 | Feng et al. | |
| 6,442,963 B1 | 9/2002 | Pfefferle et al. | |
| 6,457,326 B1 | 10/2002 | Serpente et al. | |
| 6,527,831 B2 | 3/2003 | Baksh et al. | |
| 6,705,100 B2 | 3/2004 | Heiden et al. | |
| 6,790,350 B2 | 9/2004 | Pex et al. | |
| 6,925,821 B2 | 8/2005 | Sienel | |
| 7,188,480 B2 | 3/2007 | Korin | |
| 7,282,148 B2 | 10/2007 | Dalton et al. | |
| 7,357,002 B2 | 4/2008 | Yoshimi et al. | |
| 7,387,661 B2 | 6/2008 | Qunwei et al. | |
| 7,690,219 B2 | 4/2010 | Suzuki et al. | |
| 7,713,333 B2 | 5/2010 | Rege et al. | |
| 7,758,670 B2 | 7/2010 | Wynn et al. | |
| 7,765,830 B2 | 8/2010 | Zhang | |
| 7,891,202 B1 | 2/2011 | Gallus | |
| 7,918,921 B2 | 4/2011 | Wynn | |
| 8,055,453 B2 | 11/2011 | Wyatt | |
| 8,182,592 B2 | 5/2012 | Nakamura et al. | |
| 8,216,473 B2 | 7/2012 | Wohlert | |
| 8,361,197 B2 | 1/2013 | Kawai et al. | |
| 8,394,171 B2 | 3/2013 | Elseviers et al. | |
| 8,580,015 B2 | 11/2013 | Taylor et al. | |
| 8,652,332 B2 | 2/2014 | Karnik et al. | |
| 9,067,169 B2 | 6/2015 | Patel | |
| 9,073,808 B1 | 7/2015 | Su et al. | |
| 9,175,233 B2 | 11/2015 | Goldstein et al. | |
| 9,199,191 B2 | 12/2015 | Fukuda et al. | |
| 9,216,373 B2 | 12/2015 | Girondi | |
| 9,504,962 B2 | 11/2016 | Yamaoka et al. | |
| 9,579,605 B1 | 2/2017 | Su et al. | |
| 9,610,534 B1 | 4/2017 | Thompson | |
| 9,718,023 B2 | 8/2017 | Kanetsuki et al. | |
| 9,987,568 B2 | 6/2018 | Stark et al. | |
| 9,989,285 B2 | 6/2018 | Fountain et al. | |
| 10,584,906 B2 | 3/2020 | Ranjan et al. | |
| 2002/0006369 A1 | 1/2002 | Buxbaum | |
| 2002/0148238 A1 | 10/2002 | Blume | |
| 2003/0075504 A1 | 4/2003 | Zha et al. | |
| 2003/0121840 A1 | 7/2003 | Pex et al. | |
| 2006/0011535 A1 | 1/2006 | Ikeda et al. | |
| 2006/0254422 A1 | 11/2006 | Spadaccini et al. | |
| 2007/0101759 A1 | 5/2007 | Matsuoka et al. | |
| 2007/0113581 A1 | 5/2007 | Yoshimi et al. | |
| 2007/0193285 A1 | 8/2007 | Knight et al. | |
| 2008/0202152 A1 | 8/2008 | Munoz et al. | |
| 2008/0202153 A1 | 8/2008 | Watanabe | |
| 2008/0217247 A1 | 9/2008 | Niino et al. | |
| 2010/0006503 A1 | 1/2010 | Bratton et al. | |
| 2011/0120157 A1 | 5/2011 | Wohlert | |
| 2012/0000220 A1 | 1/2012 | Altay | |
| 2013/0118198 A1 | 5/2013 | Brown et al. | |
| 2013/0283830 A1 | 10/2013 | Jandal et al. | |
| 2013/0283832 A1 | 10/2013 | Kujak et al. | |
| 2015/0053083 A1 | 2/2015 | Taylor | |
| 2015/0108165 A1* | 4/2015 | Merner | B65D 77/067 222/105 |
| 2015/0323226 A1 | 11/2015 | Haraki et al. | |
| 2016/0025393 A1 | 1/2016 | Rockwell | |
| 2016/0175740 A1 | 6/2016 | Stark et al. | |
| 2017/0014748 A1 | 1/2017 | Li et al. | |
| 2017/0122670 A1 | 5/2017 | Ahlbom | |
| 2017/0307269 A1 | 10/2017 | Gu et al. | |
| 2017/0348643 A1 | 12/2017 | Noguchi et al. | |
| 2018/0066880 A1* | 3/2018 | Ranjan | B01D 19/0031 |
| 2018/0243685 A1 | 8/2018 | Henson et al. | |
| 2020/0149791 A1* | 5/2020 | Ranjan | F25B 13/00 |
| 2021/0231354 A1 | 7/2021 | Ranjan et al. | |
| 2021/0364202 A1 | 11/2021 | Ranjan et al. | |
| 2021/0364203 A1* | 11/2021 | Ranjan | B01D 53/047 |

FOREIGN PATENT DOCUMENTS

| | | |
|---|---|---|
| CN | 101373111 A | 2/2009 |
| CN | 201363956 Y | 12/2009 |
| CN | 101910756 A | 12/2010 |
| CN | 201954828 U | 8/2011 |
| CN | 101852524 B | 7/2012 |
| CN | 203657302 U | 6/2014 |
| CN | 104785045 A | 7/2015 |
| CN | 106895617 A | 6/2017 |
| CN | 107763910 A | 3/2018 |
| CN | 108061410 A | 5/2018 |
| CN | 108344214 A | 7/2018 |
| CN | 108413665 A | 8/2018 |
| CN | 108474601 A | 8/2018 |
| DE | 19908848 A1 | 7/2000 |
| EP | 0284850 B1 | 10/1988 |
| EP | 0875281 A1 | 11/1998 |
| EP | 0943367 A1 | 9/1999 |
| EP | 1650509 A1 | 4/2006 |
| EP | 1681523 A1 | 7/2006 |
| EP | 2312241 A1 | 4/2011 |
| EP | 2815798 A1 | 12/2014 |
| EP | 3085430 A1 | 10/2016 |
| EP | 3118545 A1 | 1/2017 |
| GB | 1112580 A | 5/1968 |
| GB | 2011796 A | 7/1979 |
| GB | 2276229 A | 9/1994 |
| JP | H0552452 A | 3/1993 |
| JP | H0557125 A | 3/1993 |
| JP | H07294065 A | 11/1995 |
| JP | H10213363 A | 8/1998 |
| JP | 2005127561 A | 5/2005 |
| JP | 2005127563 A | 5/2005 |
| JP | 2005127564 A | 5/2005 |
| JP | 2005127565 A | 5/2005 |
| JP | 4265369 B2 | 5/2009 |
| JP | 2010159952 A | 7/2010 |
| JP | 11248298 | 9/2011 |
| JP | 2013039546 A | 2/2013 |
| JP | 5585307 | 9/2014 |
| JP | 2015182070 A | 10/2015 |
| KR | 101533348 B1 | 7/2015 |
| WO | 9717125 A1 | 5/1997 |
| WO | 2015020719 A1 | 2/2015 |

(56) References Cited

FOREIGN PATENT DOCUMENTS

| WO | 2015091303 A1 | 6/2015 |
| WO | 2017184663 A1 | 10/2017 |
| WO | 2018134789 A1 | 7/2018 |

OTHER PUBLICATIONS

International Search Report of the International Searching Authority; International Application No. PCT/US2019/063512; International Filing Date: Nov. 27, 2019; dated Feb. 18, 2020; 5 pages.
International Search Report of the International Searching Authority; International Application No. PCT/US2019/063657; International Filing Date: Nov. 27, 2019; dated Feb. 18, 2020; 5 pages.
International Search Report of the International Searching Authority; International Application No. PCT/US2019/064174; International Filing Date: Dec. 3, 2019; dated Feb. 18, 2020; 6 pages.
Written Opinion of the International Searching Authority; International Application No. PCT/US2019/063502; International Filing Date: Nov. 27, 2019; dated Mar. 30, 2020; 10 pages.
Written Opinion of the International Searching Authority; International Application No. PCT/US2019/063512; International Filing Date: Nov. 27, 2019; dated Feb. 18, 2020; 7 pages.
Written Opinion of the International Searching Authority; International Application No. PCT/US2019/063657; International Filing Date: Nov. 27, 2019; dated Feb. 18, 2020; 7 pages.
Written Opinion of the International Searching Authority; International Application No. PCT/US2019/064174; International Filing Date: Dec. 3, 2019; dated Dec. 3, 2018; 7 pages.
"Cascade Reverse Osmosis and the Absorption Osmosis Cycle"; Battelle Memorial Institute; ARPA-E; Retrieved Online from http://arpa-e.energy.gov/?q=slick-sheet-project/cascade-reverse-osmosis-air-conditioning-system on Jul. 12, 2010; 1 Page.
"Non-Condensable Gas Purge Equipment for Use with Low Pressure Centrifugal Liquid Chillers"; AHRI Laboratory; Air-Conditioning Heating, & Refrigeration Institute; Oct. 26, 2018; 2 Pages.
Biruh Shimekit and Hilmi Mihtar (2012). Natural Gas Purification Technologies—Major Advances for CO2 Separation and Future Directions, Advances in Natural Gas Technology, Dr. Hamid Al-megren (Ed.)ISBN:978-953-51-0507-7, pp. 235-270, http://cdn.intechopen.com/pdfs/35293/InTech-Natural_gas_purification_technologies_major_advances_for_co2_separation_and_future_directions.pdf.
Chinese Office Action and Search Report from Chinese Application No. 201480044756.4 dated Apr. 28, 2017; 17 Pages.
Chinese Office Action and Search Report from Chinese Application No. 201480044756.4 dated Dec. 14, 2017; 18 Pages.
Coronas et al.; "Separations Using Zeolite Membranes"; Separation and Purification Methods; vol. 28, Issue 2; 1999; 6 Pages.
Daramola et al.; "Potential Applications of Zeolite Membranes in Reaction Coupling Separation Processes"; Materials; vol. 5; 2012; pp. 2101-2136.
Extended European Search Report; International Application No. 18205247.2-1008; International Filing Date: Nov. 8, 2018; dated Mar. 14, 2019; 7 pages.
International Search Report of the International Searching Authority; International Application No. PCT/US2014/040795; International filing date: Jun. 4, 2014; dated Aug. 29, 2014, 4 pages.
Rao et al.; "Nanoporous Carbon Membranes for Separation of Gas Mixtures by Selective Surface Flow"; Journal of Membrane Science; vol. 85, Issue 3; Dec. 2, 1993; pp. 253-264.
U.S. Non-Final Office Action; U.S. Appl. No. 14/909,542; Application Filing Date: Feb. 2, 2016; dated Sep. 21, 2017; 23 pages.
U.S. Non-Final Office Action; U.S. Appl. No. 15/808,837; Application Filing Date: Nov. 9, 2017; dated Jun. 6, 2019; 32 pages.
Written Opinion of the International Searching Authority; International Application No. PCT/US2014/040795; International Filing Date: Jun. 4, 2014; dated Aug. 29, 2014; 4 pages.
International Preliminary Report on Patentability; International Application No. PCT/US2019/063502; International Filing Date: Nov. 27, 2019; dated Jun. 17, 2021; 10 pages.
International Preliminary Report on Patentability; International Application No. PCT/US2019/063512; International Filing Date: Nov. 27, 2019; dated Jun. 17, 2021; 7 pages.
International Preliminary Report on Patentability; International Application No. PCT/US2019/063657; International Filing Date: Nov. 27, 2019; dated Jun. 17, 2021; 7 pages.
International Preliminary Report on Patentability; International Application No. PCT/US2019/064174; International Filing Date: Dec. 3, 2019; dated Jun. 17, 2021; 7 pages.
Chinese First Office Action; Chinese Application No. 201980041006.4; dated Jul. 15, 2022; 14 pages.
Chinese First Office Action; Chinese Application No. 201980041011.5; dated Aug. 5, 2022; 17 pages.
U.S. Final Office Action; U.S. Appl. No. 15/734,844; dated Aug. 8, 2022; 14 pages.
Chinese Office Action for Chinese Application No. 201980041006.4; Report dated Feb. 11, 2023 (pp. 1-3).
Chinese Office Action for Chinese Application No. 201980041011.5; Report dated Feb. 24, 2023 (pp. 1-6).
U.S. Non-Final Office Action; U.S. Appl. No. 15/734,844; filed Dec. 3, 2020; dated Jan. 27, 2022; 34 pages.
Chinese Office Action for Chinese Application No. 201980041015.3; Report dated Dec. 28, 2022 (pp. 1-8).
U.S. Non-Final Office Action; U.S. Appl. No. 15/734,846; dated Mar. 20, 2023; 42 pages.
U.S. Non-Final Office Action; U.S. Appl. No. 15/734,392; dated Jul. 18, 2023; 11 pages.
Chinese Office Action for Chinese Application No. 201980041015.3; Report dated Sep. 28, 2023 (pp. 1-14—With machine translation).

* cited by examiner

ENHANCED REFRIGERATION PURGE SYSTEM

CROSS REFERENCE TO RELATED APPLICATIONS

This application is a National Stage Application of PCT/US2019/064174, filed Dec. 3, 2019, which claims priority to U.S. Provisional Application 62/774,701 filed Dec. 3, 2018, both of which are incorporated by reference in their entirety herein.

BACKGROUND

This disclosure relates generally to chiller systems used in air conditioning systems, and more particularly to a purge system for removing contaminants from a refrigeration system.

Chiller systems such as those utilizing centrifugal compressors may include sections that operate below atmospheric pressure. As a result, leaks in the chiller system may draw air into the system, contaminating the refrigerant. This contamination degrades the performance of the chiller system. To address this problem, existing low pressure chillers include a purge unit to remove contamination. Existing purge units use a vapor compression cycle to separate contaminant gas from the refrigerant. Existing purge units are complicated and lose refrigerant in the process of removing contamination.

BRIEF DESCRIPTION

According to an embodiment, a heat pump includes a vapor compression system and a cooling unit thermally coupled to the vapor compression system. A purge system is arranged in fluid communication with the vapor compression system. The purge system includes at least one separator operable to separate contaminants from a refrigerant purge gas provided to the purge system from the vapor compression system.

In addition to one or more of the features described above, or as an alternative, in further embodiments the cooling unit includes another vapor compression system.

In addition to one or more of the features described above, or as an alternative, in further embodiments the purge system further comprises a purge container, the vapor compression system and the cooling unit being thermally coupled at the purge container.

In addition to one or more of the features described above, or as an alternative, in further embodiments comprising a heat exchange element positioned within a hollow interior of the purge container, wherein the heat exchange element is part of the vapor compression system.

In addition to one or more of the features described above, or as an alternative, in further embodiments the refrigerant purge gas is provided from the vapor compression system to the hollow interior of the purge container.

In addition to one or more of the features described above, or as an alternative, in further embodiments the purge container includes a first outlet in fluid communication with a downstream component of the purge system and a second outlet in fluid communication with the vapor compression system.

In addition to one or more of the features described above, or as an alternative, in further embodiments liquid refrigerant within the hollow interior of the purge container is returned to the vapor compression system via the second outlet.

In addition to one or more of the features described above, or as an alternative, in further embodiments the at least one separator further comprises a separating material operable to separate the contaminants from the refrigerant purge gas provided from the vapor compression system.

In addition to one or more of the features described above, or as an alternative, in further embodiments a first side of the at least one membrane is fluidly coupled to the first outlet of the purge container.

In addition to one or more of the features described above, or as an alternative, in further embodiments the separating material includes a sorption based material.

In addition to one or more of the features described above, or as an alternative, in further embodiments the separating material includes at least one membrane.

In addition to one or more of the features described above, or as an alternative, in further embodiments the at least one membrane includes a porous material having pores sized to allow passage of contaminants through the membrane and restrict passage of refrigerant through the membrane.

In addition to one or more of the features described above, or as an alternative, in further embodiments comprising a prime mover operably coupled to the separator to selectively create a pressure within the separator.

In addition to one or more of the features described above, or as an alternative, in further embodiments the prime mover is a vacuum pump.

In addition to one or more of the features described above, or as an alternative, in further embodiments the vapor compression system further comprises a heat rejection heat exchanger and a heat absorption heat exchanger.

In addition to one or more of the features described above, or as an alternative, in further embodiments the refrigerant purge gas is provided from the heat rejection heat exchanger to the purge system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
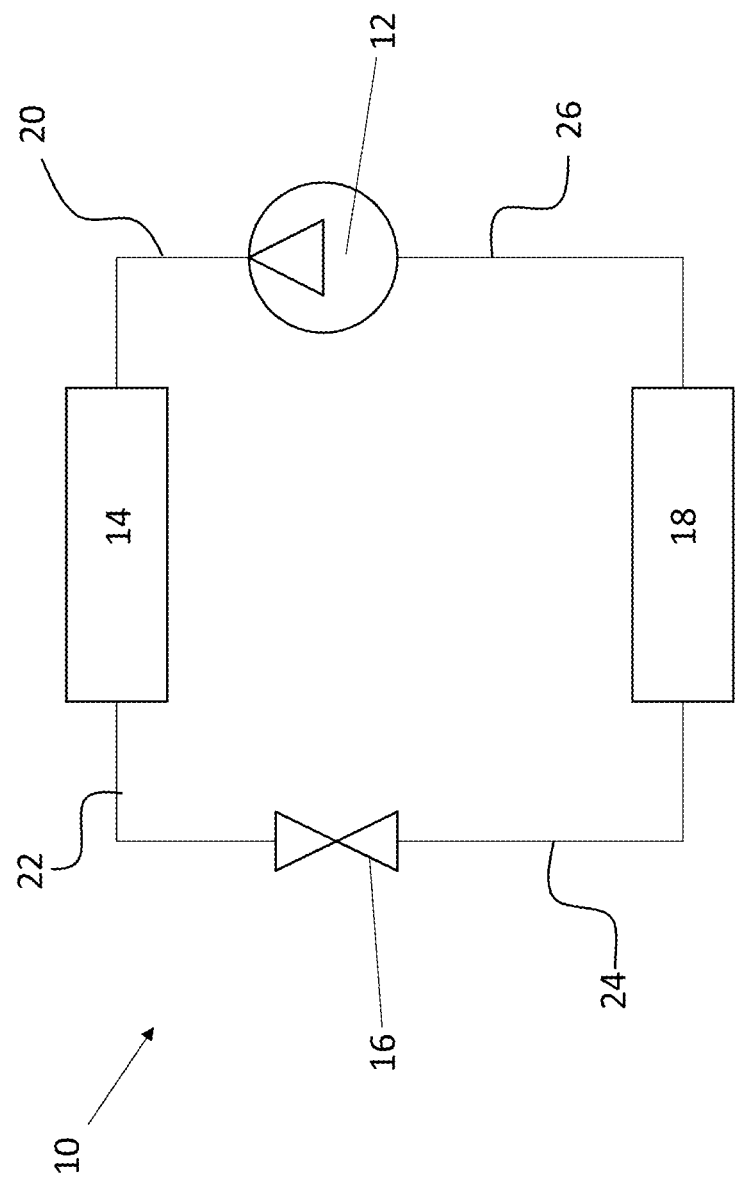
FIG. 1 is a schematic diagram of a vapor compression system of a refrigerant system.

Referring now to FIG. 1, an example of a heat pump 10 is illustrated. As used herein, the term heat pump is intended to include any system capable of heating and/or cooling, such as a vapor compression system, a sorption system, a geothermal system, a waste heat recovery system, a heat based cooling system, and a heating system. As shown, the heat pump 10 includes a compressor 12, a condenser 14, an expansion valve 16, and an evaporator 18 arranged to form a fluid loop. The compressor 12 pressurizes heat transfer fluid in its gaseous state, which both heats the fluid and provides pressure to circulate it through the system. In some embodiments, the heat transfer fluid, or refrigerant, includes an organic compound. For example, in some embodiments, the refrigerant comprises at least one of a hydrocarbon, substituted hydrocarbon, a halogen-substituted hydrocarbon, a fluoro-substituted hydrocarbon, or a chloro-fluoro-substituted hydrocarbon.

The hot pressurized gaseous heat transfer fluid exiting from the compressor 12 flows through a conduit 20 to a heat rejection heat exchanger such as condenser 14. The condenser is operable to transfer heat from the heat transfer fluid to the surrounding environment, resulting in condensation of the hot gaseous heat transfer fluid to a pressurized moderate temperature liquid. The liquid heat transfer fluid exiting from the condenser 14 flows through conduit 22 to expansion valve 16, where the pressure is reduced. The reduced pressure liquid heat transfer fluid exiting the expansion valve 16 flows through conduit 24 to a heat absorption heat exchanger such as evaporator 18. The evaporator 18 functions to absorb heat from the surrounding environment and boil the heat transfer fluid. Gaseous heat transfer fluid exiting the evaporator 18 flows through conduit 26 to the compressor 12, so that the cycle may be repeated.

The heat pump 10 has the effect of transferring heat from the environment surrounding the evaporator 18 to the environment surrounding the condenser 14. The thermodynamic properties of the heat transfer fluid must allow it to reach a high enough temperature when compressed so that it is greater than the environment surrounding the condenser 14, allowing heat to be transferred to the surrounding environment. The thermodynamic properties of the heat transfer fluid must also have a boiling point at its post-expansion pressure that allows the temperature surrounding the evaporator 18 to provide heat to vaporize the liquid heat transfer fluid.

Various types of refrigeration systems may be classified as a heat pump 10 as illustrated and described herein. One such refrigeration system is a chiller system. Portions of a refrigeration system, such as the cooler of a chiller system for example, may operate at a low pressure (e.g., less than atmosphere) which can cause contamination (e.g., ambient air) to be drawn into fluid loop of the heat pump 10. The contamination degrades performance of the refrigeration system. To improve operation, the heat pump 10 may additionally include a purge system 30 for removing contamination from the heat transfer fluid of the heat pump 10.

Figure 2:
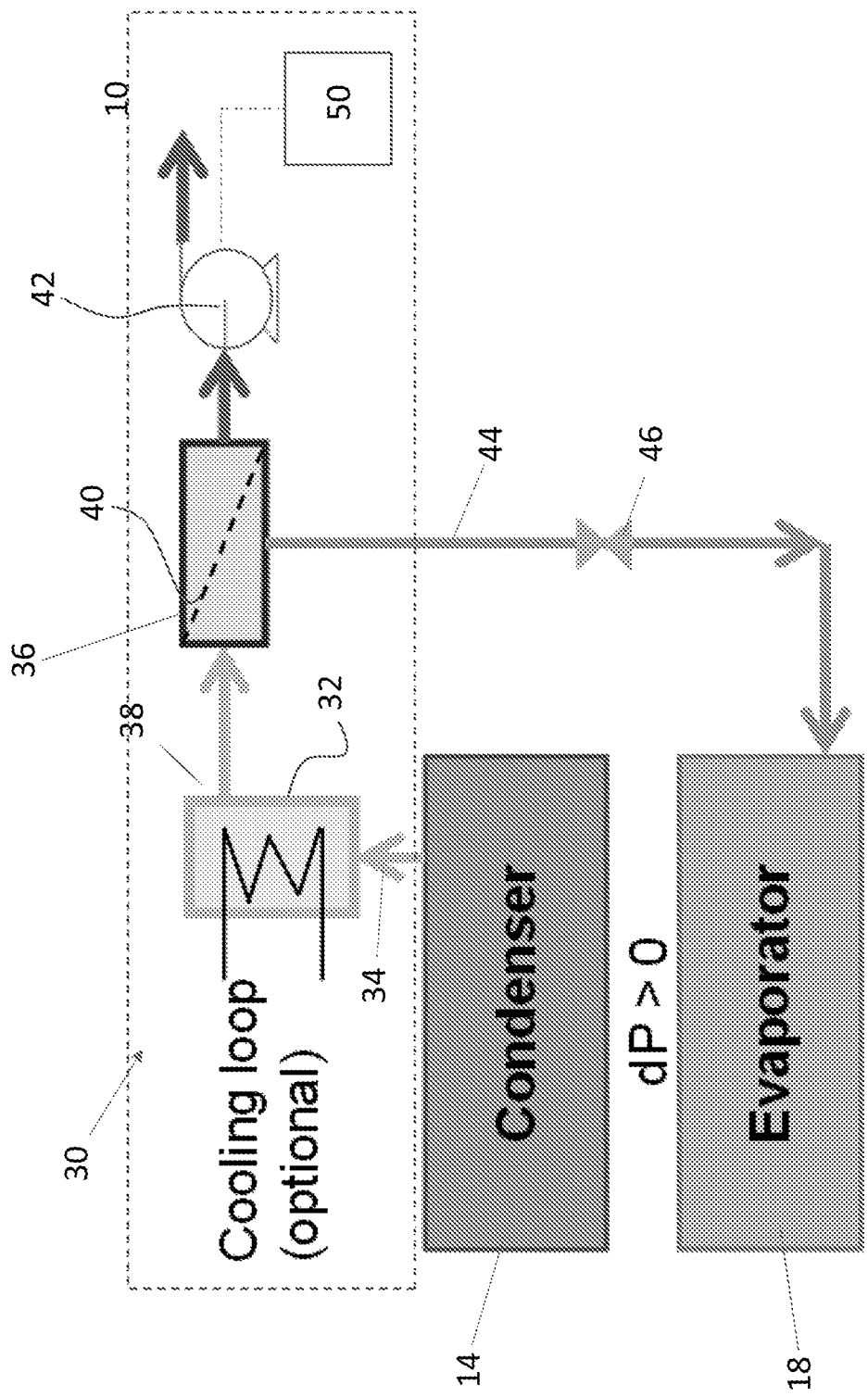
FIG. 2 is a schematic diagram of a vapor compression system including a purge system according to an embodiment.

With reference now to FIG. 2, an example of a heat pump 10 including a purge system 30 is illustrated in more detail. As shown, the purge system 30 includes a purge container 32 connected to the condenser 18 of a heat pump 10 via a purge connection 34. The purge container 32 receives purge gas including refrigerant gas and contaminants, such as nitrogen and oxygen for example, from the purge connection 34. The purge system 30 additionally includes at least one separator 36 arranged downstream from and in fluid communication with an outlet 38 of the purge container 32. In the illustrated, non-limiting embodiment, the separator 36 includes a separating material 40 for separating contaminants from the refrigerant gas. In other embodiments, the separator 36 may include a vessel or housing containing one or more beds of sorbent material operable to separate a non-condensable gas from the purge gas through pressure swing sorption (PSA). Although a single separator 36 is illustrated, it should be understood that embodiments including a plurality of separators 36, arranged in series or parallel, are also contemplated herein.

In embodiments where the separating material 40 includes a membrane, the membrane may include a porous inorganic material. Examples of porous inorganic material can include ceramics such as metal oxides or metal silicates, more specifically aluminosilicates, (e.g., Chabazite Framework (CHA) zeolite, Linde type A (LTA) zeolite), porous carbon, porous glass, clays (e.g., Montmorillonite, Halloysite). Porous inorganic materials can also include porous metals such as platinum and nickel. Hybrid inorganic-organic materials such as a metal organic framework (MOF) can also be used. Other materials can be present in the membrane such as a carrier in which a microporous material can be dispersed, which can be included for structural or process considerations.

Metal organic framework materials are well-known in the art, and comprise metal ions or clusters of metal ions coordinated to organic ligands to form one-, two- or three-dimensional structures. A metal-organic framework can be characterized as a coordination network with organic ligands containing voids. The coordination network can be characterized as a coordination compound extending, through repeating coordination entities, in one dimension, but with cross-links between two or more individual chains, loops, or spiro-links, or a coordination compound extending through repeating coordination entities in two or three dimensions. Coordination compounds can include coordination polymers with repeating coordination entities extending in one, two, or three dimensions. Examples of organic ligands include but are not limited to bidentate carboxylates (e.g., oxalic acid, succinic acid, phthalic acid isomers, etc.), tridentate carboxylates (e.g., citric acid, trimesic acid), azoles (e.g., 1,2,3-triazole), as well as other known organic ligands. A wide variety of metals can be included in a metal organic framework. Examples of specific metal organic framework materials include but are not limited to zeolitic imidazole framework (ZIF), HKUST-1.

In embodiments where the separating material 40 includes a sorbent material, the sorbent material may be a porous inorganic material. Examples of suitable sorbent materials include, but are not limited to, zeolites, activated carbon, ionic liquids, metal organic framework, oils, clay materials, and molecular sieves for example. When the bed of sorbent material is pressurized to a high, adsorption pressure, the more readily adsorbable component of the purge gas provided to the inlet end 42 of the separator 36 is selectively adsorbed by the sorbent material and forms an adsorption front that passes from the inlet end toward the outlet end. The less readily adsorbable component of the purge gas passes through the bed of sorbent material 40 and is recovered from the outlet end thereof for further processing or use downstream. In the illustrated, non-limiting embodiment, the contaminant within the purge gas, such as oxygen for example, is the more readily adsorbable component, and the refrigerant is the less adsorbable component within the purge gas. Accordingly, if the purge gas is passed through a separator 36 containing a bed of sorbent material that attracts oxygen, part or all of the oxygen in the purge gas will stay within the bed of sorbent material. Consequently, the purge gas discharged from the outlet end of the separator 36 will be richer in refrigerant than the purge gas entering the separator 36.

When the bed of sorbent material reaches the end of its capacity to adsorb oxygen, the bed of sorbent material can be regenerated by changing the pressure acting thereon. By reducing the pressure, the adsorbed oxygen will be released from the bed of sorbent material, and may be exhausted from the separator 36, such as to the ambient atmosphere, external to the refrigeration circuit. However, it should be understood that in other embodiments, the bed of sorbent material may be regenerated via application of either a positive or negative pressure.

In some embodiments, pore sizes of the separating material 40 can be characterized by a pore size distribution with an average pore size from 2.5 Å to 10.0 Å, and a pore size distribution of at least 0.1 Å. In some embodiments, the average pore size for the porous material can be in a range with a lower end of 2.5 Å to 4.0 Å and an upper end of 2.6 Å to 10.0 Å. A. In some embodiments, the average pore size can be in a range having a lower end of 2.5 Å, 3.0 Å, 3.5 Å, and an upper end of 3.5 Å, 5.0 Å, or 6.0 Å. These range endpoints can be independently combined to form a number of different ranges, and all ranges for each possible combination of range endpoints are hereby disclosed. Porosity of the material can be in a range having a lower end of 5%, 10%, or 15%, and an upper end of 85%, 90%, or 95% (percentages by volume). These range endpoints can be independently combined to form a number of different ranges, and all ranges for each possible combination of range endpoints are hereby disclosed.

The above microporous materials can be can be synthesized by hydrothermal or solvothermal techniques (e.g., sol-gel) where crystals are slowly grown from a solution. Templating for the microstructure can be provided by a secondary building unit (SBU) and the organic ligands. Alternate synthesis techniques are also available, such as physical vapor deposition or chemical vapor deposition, in which metal oxide precursor layers are deposited, either as a primary microporous material, or as a precursor to an MOF structure formed by exposure of the precursor layers to sublimed ligand molecules to impart a phase transformation to an MOF crystal lattice.

In some embodiments, the above-described membrane materials can provide a technical effect of promoting separation of contaminants (e.g., nitrogen, oxygen and/or water molecules) from refrigerant gas, which is condensable. Other air-permeable materials, such as porous or non-porous polymers can be subject to solvent interaction with the matrix material, which can interfere with effective separation. In some embodiments, the capabilities of the materials described herein can provide a technical effect of promoting the implementation of a various example embodiments of refrigeration systems with purge, as described in more detail with reference to the example embodiments below.

The separating material 40 can be self-supporting or it can be supported, for example, as a layer on a porous support or integrated with a matrix support material. In some embodiments, thickness of a support for a supported membrane can range from 50 nm to 1000 nm, more specifically from 100 nm to 750 nm, and even more specifically from 250 nm to 500 nm. In the case of tubular membranes, fiber diameters can range from 100 nm to 2000 nm, and fiber lengths can range from 0.2 m to 2 m.

In some embodiments, the microporous material can be deposited on a support as particles in a powder or dispersed in a liquid carrier using various techniques such as spray coating, dip coating, solution casting, etc. The dispersion can contain various additives, such as dispersing aids, rheology modifiers, etc. Polymeric additives can be used; however, a polymer binder is not needed, although a polymer binder can be included and in some embodiments is included such as with a mixed matrix membrane comprising a microporous inorganic material (e.g., microporous ceramic particles) in an organic (e.g., organic polymer) matrix. However, a polymer binder present in an amount sufficient to form a contiguous polymer phase can provide passageways in the membrane for larger molecules to bypass the molecular sieve particles. Accordingly, in some embodiments a polymer binder is excluded. In other embodiments, a polymer binder can be present in an amount below that needed to form a contiguous polymer phase, such as embodiments in which the membrane is in series with other membranes that may be more restrictive. In some embodiments, particles of the microporous material (e.g., particles with sizes of 0.01 μm to 10 mm, or in some embodiments from 0.5 μm to 10 μm) can be applied as a powder or dispersed in a liquid carrier (e.g., an organic solvent or aqueous liquid carrier) and coated onto the support followed by removal of the liquid. In some embodiments, the application of solid particles of microporous material from a liquid composition to the support surface can be assisted by application of a driving force across the support. For example a vacuum can be applied from the opposite side of the support as the liquid composition comprising the solid microporous particles to assist in application of the solid particles to the surface of the support. A coated layer of microporous material can be dried to remove residual solvent and optionally heated to fuse the microporous particles together into a contiguous layer. Various membrane structure configurations can be utilized, including but not limited to flat or planar configurations, tubular configurations, or spiral configurations. In some embodiments, the membrane can include a protective polymer coating or can utilize or can utilize backflow or heating to regenerate the membrane.

In some embodiments, the microporous material can be configured as nanoplatelets, such as zeolite nanosheets for example. Zeolite nanosheet particles can have thicknesses ranging from 2 to 50 nm, more specifically 2 to 20 nm, and even more specifically from 2 nm to 10 nm. Zeolite such as zeolite nanosheets can be formed from any of various zeolite structures, including but not limited to framework type MFI, MWW, FER, LTA, FAU, and mixtures of the preceding with each other or with other zeolite structures. In a more specific group of exemplary embodiments, the zeolite such as zeolite nanosheets can comprise zeolite structures selected from MFI, MWW, FER, LTA framework type. Zeolite nanosheets can be prepared using known techniques such as exfoliation of zeolite crystal structure precursors. For example, MFI and MWW zeolite nanosheets can be prepared by sonicating the layered precursors (multilamellar silicalite-1 and ITQ-1, respectively) in solvent. Prior to sonication, the zeolite layers can optionally be swollen, for example with a combination of base and surfactant, and/or melt-blending with polystyrene. The zeolite layered precursors are typically prepared using conventional techniques for preparation of microporous materials such as sol-gel methods.

With continued reference to FIG. 2, at least one prime mover 42 may be selectively coupled to the separator 36 to provide a driving force to pass contaminant gas molecules through the separating material 40, such that the contaminant molecules collect therein, or exit from a second side of the separating material 40 and through an outlet of the purge system 30. However, alternative embodiments where refrigerant molecules are configured to pass through the separating material 40 instead of contaminant molecules are also contemplated herein. The at least one prime mover 42 may include a pump, and the driving force generated by the pump may be a positive or negative pressure.

As shown the prime mover 42 is isolated from the vapor compression loop of the heat pump 10. In other embodiments, the prime mover 42 can be positioned within the fluid circuit of the heat pump 10. For example, a refrigerant pump or compressor may be used as the prime mover 42. Refrigerant gas tends to remain on the first side of the separating material 40 and may be returned to the vapor compression system 10 through a connection or conduit illustrated at 44, such as having a movable control valve 46.

A controller 50 is operably coupled to the prime mover 42. In an embodiment, the controller 50 receives system data (e.g., pressure, temperature, mass flow rates) and utilizes electronic control components, such as a microprocessor for example, to control operation of one or more components of the purge system 30, such as various pumps, valves, and switches for example, in response to the system data. The purge system 30 illustrated and described herein is intended as an example only, and other configurations are also within the scope of the disclosure. Other examples of purge systems contemplated herein are set forth in more detail in U.S. patent application Ser. No. 15/808,837 filed on Nov. 9, 2017, the entire contents of which is incorporated herein by reference.

When the heat pump 10 is operational, the refrigerant may be passively decontaminated. The pressure from the condenser 18 may create a pressure differential suitable to achieve the required driving force across the separating material 40. As a result, one of refrigerant and contamination passes through the separating material 40 from a first side to a second side. When the heat pump 10 is non-operational, active decontamination of the separating material 40 is initiated. During active decontamination, the prime mover 42 is used to provide the necessary pressure differential across the separating material 40 for decontamination.

Figure 3:
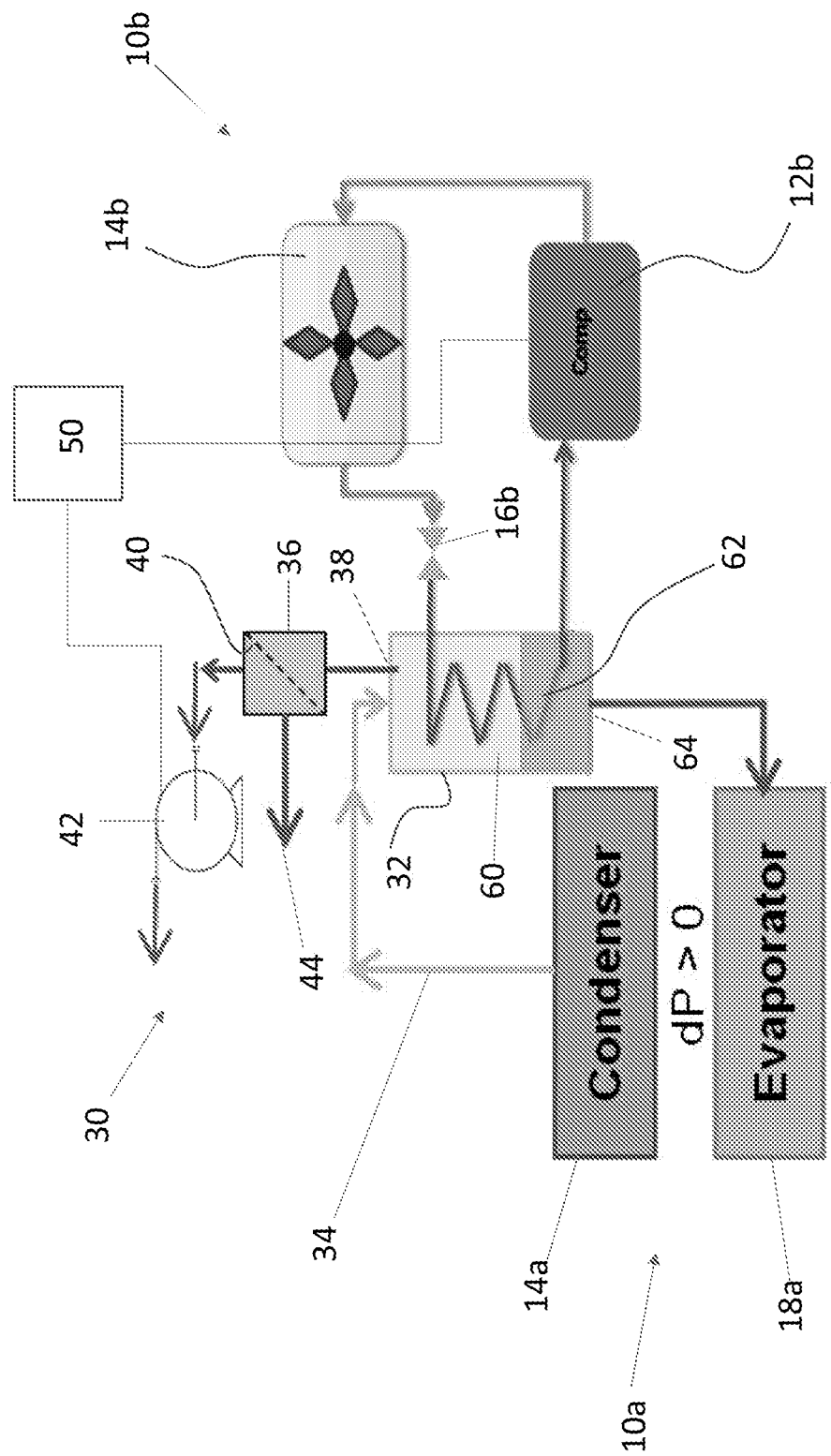
FIG. 3 is a schematic diagram of another vapor compression system including a purge system according to an embodiment.

With reference now to FIG. 3, another embodiment of a heat pump 10 including the purge system 30 is illustrated. In the illustrated, non-limiting embodiment, the heat pump 10 includes two separate fluid circuits arranged in thermal communication with one another. The first fluid circuit 10a is a vapor compression refrigeration system, including a condenser 14a and an evaporator 18a, illustrated in the FIG, through which a first heat transfer fluid circulates. In the illustrated, non-limiting embodiment, the second fluid circuit 10b is also a vapor compression system including a compressor 12b, a heat rejection heat exchanger 14b, and an expansion valve 16b, through which a second heat transfer fluid circulates. However, it should be understood that the second fluid circuit 10b may be any type of cooling unit. As used herein, the term "cooling unit" is intended to include a plurality of different types of system, including but not limited to a chiller system, a refrigeration system, a thermoelectric cooling system, and a pulse tube for example.

As shown in FIG. 3, the first and second fluid circuits 10a, 10b are coupled to one another at a purge container 32. The purge container 32 has a generally hollow interior 60 with a heat exchange element 62 positioned therein. The hollow interior 60 of the purge container 32 defines a first fluid flow path configured to receive purge gas from the condenser 14a and return a second refrigerant to the evaporator 18a of the first fluid circuit 10a via a first outlet 64. Similarly, the heat exchange element 62 defines a second flow path arranged in fluid communication with the second fluid circuit 10b at a position downstream from the expansion valve 16b and upstream from compressor 12b.

As previously described, the purge gas includes a combination of vaporized second refrigerant and contaminants (e.g. nitrogen, oxygen). The purge gas is provided to the hollow interior 60 of the purge container 32 via a purge connection 34 connected to the condenser 14b. The purge gas provided to the hollow interior 60 of the purge container 32 from the first fluid circuit 10a is arranged in a heat transfer relationship with the refrigerant from the second fluid circuit 10b as it passes through the heat exchange element 62. Within the heat exchange element 62, the second heat transfer fluid absorbs heat from the surrounding environment, i.e. the purge gas, thereby causing the first heat transfer fluid to vaporize prior to being returned to the compressor 12b.

As the purge gas provided to the hollow interior 60 of the purge container 32 interacts with the heat exchange element 62, a portion of the purge gas may cool and condense into a liquid. Inclusion of the heat exchange element 62 within the hollow interior 60 of the purge container 32 may therefore promote stratification through thermally-induced densification of refrigerant gas and/or through condensation of refrigerant gas. Accordingly, the lighter non-condensable contaminants will concentrate towards the top of the purge container 32 and the heavier refrigerant will concentrate toward the bottom of the purge container 32. In an embodiment, the liquid refrigerant at the bottom of the hollow interior 60 of the purge container 32 is provided to a downstream component of the first fluid circuit 10a, such as the evaporator 18a for example, via the first outlet 64.

The relatively less dense contaminant gases flow upward through a second outlet 38 formed in the purge container 32. From the second outlet 38, the contaminant gases are directed to the first side of a membrane 40 in the separator 36. The prime mover 42 connected to the separator 36 is selectively operable to provide a driving force to pass the contaminant gas molecules through the membrane 40 and exit the purge system 30 from a second side of the membrane 40 through an outlet. As previously described, from the separator 36, the first heat transfer fluid or refrigerant may be returned to the first fluid circuit 10a. The refrigerant output from the separator 36 has fewer contaminants than the refrigerant provided to the separator 36 from the purge container 32.

The purge system 30 illustrated and described herein may be easily retrofit into existing refrigeration systems. In addition, a heat pump 10 including such a purge system may achieve reduced or negligible refrigerant loss. In addition, the operating and maintenance costs may be reduced while improving not only the reliability, but the operational efficiency of the purge system 30.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat pump comprising:
a vapor compression system;
a closed loop cooling unit fluidly separate from the vapor compression system, the cooling unit being thermally coupled to the vapor compression system; and
a purge system in fluid communication with the vapor compression system, the purge system including at least one separator operable to separate contaminants from a refrigerant purge gas provided to the purge system from the vapor compression system.

2. The heat pump of claim 1, wherein the cooling unit includes another vapor compression system.

3. The heat pump of claim 1, wherein the purge system further comprises a purge container, the vapor compression system and the cooling unit being thermally coupled at the purge container.

4. The heat pump of claim 3, further comprising a heat exchange element positioned within a hollow interior of the purge container, wherein the heat exchange element is part of the vapor compression system.

5. The heat pump of claim 4, wherein the refrigerant purge gas is provided from the vapor compression system to the hollow interior of the purge container.

6. The heat pump of claim 5, wherein the purge container includes a first outlet in fluid communication with a downstream component of the purge system and a second outlet in fluid communication with the vapor compression system.

7. The heat pump of claim 6, wherein liquid refrigerant within the hollow interior of the purge container is returned to the vapor compression system via the second outlet.

8. The heat pump of claim 6, wherein the at least one separator further comprises a separating material operable to separate the contaminants from the refrigerant purge gas provided from the vapor compression system.

9. The heat pump of claim 8, wherein a first side of the at least one membrane is fluidly coupled to the first outlet of the purge container.

10. The heat pump of claim 8, wherein the separating material includes a sorption based material.

11. The heat pump of claim 8, wherein the separating material includes at least one membrane.

12. The heat pump of claim 11, wherein the at least one membrane includes a porous material having pores sized to allow passage of contaminants through the membrane and restrict passage of refrigerant through the membrane.

13. The heat pump of claim 1, further comprising a prime mover operably coupled to the separator to selectively create a pressure within the separator.

14. The heat pump of claim 13, wherein the prime mover is a vacuum pump.

15. The heat pump of claim 1, wherein the vapor compression system further comprises a heat rejection heat exchanger and a heat absorption heat exchanger.

16. The heat pump of claim 15, wherein the refrigerant purge gas is provided from the heat rejection heat exchanger to the purge system.

* * * * *